May 28, 1968      J. HEINES      3,385,625

BEER BARREL HOOK

Filed Sept. 7, 1966

INVENTOR.

Joseph Heines 3,385,625
BEER BARREL HOOK
Joseph Heines, 58—18 69th Ave.,
Ridgewood, N.Y. 11227
Filed Sept. 7, 1966, Ser. No. 577,720
1 Claim. (Cl. 294—26)

ABSTRACT OF THE DISCLOSURE

A T-configurated hook for manually maneuvering beer barrels, the hook including a cross handle that fits within a workman's hand, and a projecting hook specially configurated so to be adaptable for pulling around barrels.

---

This invention relates to the lifting and supporting devices, and more particularly a beer barrel hook.

It is therefore the main purpose of this invention to provide a beer barrel hook which is used in carrying a plurality of beer barrels thereby saving a considerable amount of manual labor and cost.

Another object of this invention is to provide a beer barrel hook which is also particularly adapted for pulling empty barrels out of close quarters, such as, an ice box.

Another object of this invention is to provide a beer barrel hook which eliminates unnecessary bending and strenuous effort by the person who is assigned to transport the beer barrels.

Still another object of this invention is to provide a beer barrel hook which is inexpensive to manufacture, may be mass produced, may be moderately priced, is safe to use, is of rugged construction and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

Figure 1:
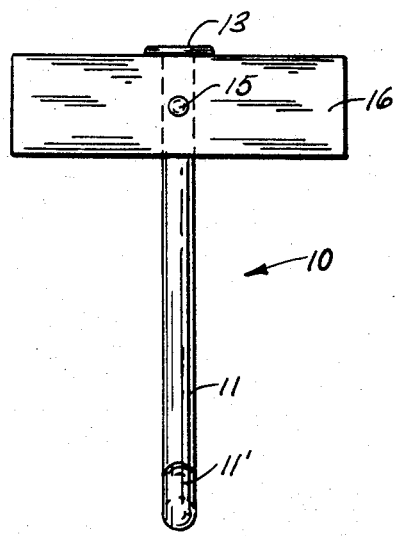
FIGURE 1 is a rear view of this invention in elevation.
Figure 2:
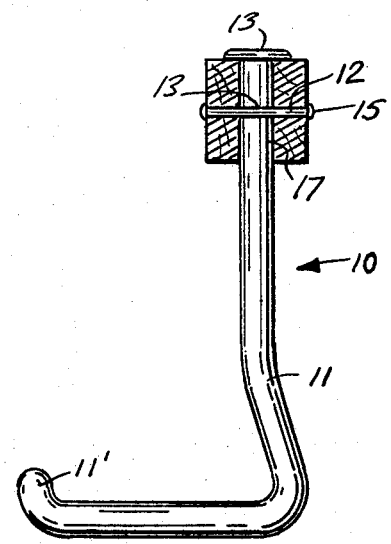
FIGURE 2 is a side view as seen from the right side of FIGURE 1, the handle being shown in vertical section.
Figure 3:
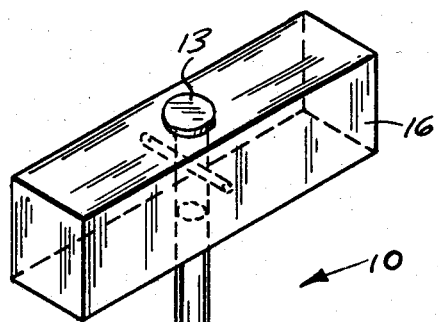
FIGURE 3 is a perspective view of the hook assembly.
Figure 4:
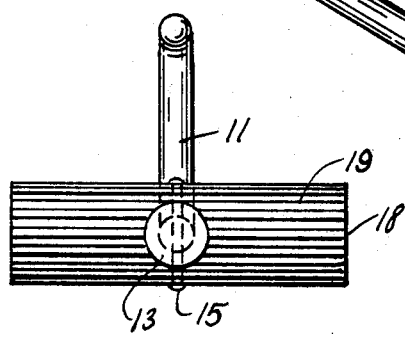
FIGURE 4 is a top plan view of a modification of this invention in which the handle is of round configuration and being longitudinally serrated.

According to this invention, a beer barrel hook 10 is provided with a metallic hook member 11 of substantially J-configuration, which is made of rod-like material. The end portion of hook member 11 is provided with an upwardly extending projection 11' for providing gripping means on the edge portions of beer barrels (not shown). A rectangular wooden block 16 is provided with a centrally located, transversely disposed hole 17 for admitting the top portion of hook member 11 therein. A flattened top end of circular configuration 13 is integrally secured with the remainder of member 11. Rectangular block 16 is also provided with a perpendicularly positioned hole 12 which is concentric with hole 13' of hook member 11. A locking pin 15 is received within said holes 12 and 13' for snugly securing hook member 11 within block 16.

It will also be noted that, in its modified form, the invention provides for a cylindrical handle member 18 which is provided with a plurality of closely spaced, longitudinal serrations 19 for providing grasping means to said barrel hook. Like in the preferred embodiment, handle 18 is provided with a flattened top end 13 and locking pin 15 to facilitate securing of hook member 11 within handle 18.

What I now claim is:

1. A hook for manually maneuvering beer barrels, comprising, in combination, a hook member and a handle, said handle comprising a rectangular block having flat opposite side walls bounded between square configurated end walls, said hook member having an elongated shank, one end of sad shank extending through a transverse opening centrally positioned opposite longitudinal ends of said handle, said shank end having an enlarged head at its terminal end, said enlarged head being adjacent one of said flat side walls, a securing rivet extending transversely through said handle and through said shank thus securing said hook member to said handle, the opposite end of said shank having an angularly extending straight portion respective to said shank, the opposite end of said angularly extending portion being rounded and being adjacent a straight arm which is in a plane perpendicular to said shank, and said straight arm having at its opposite end a terminal portion that is turned to extend parallel to said angularly extending portion.

References Cited

UNITED STATES PATENTS

| | | | |
|---|---|---|---|
| 187,272 | 2/1877 | Hauschildt | 294—26 |
| 2,957,208 | 10/1960 | Gardner et al. | 273—67 |
| 3,310,331 | 3/1967 | Michaud | 294—26 |

EVON C. BLUNK, *Primary Examiner.*

R. D. GUIOD, *Assistant Examiner.*